Sept. 15, 1931.  B. READ  1,823,168
SPRING CONSTRUCTION
Filed March 5, 1930
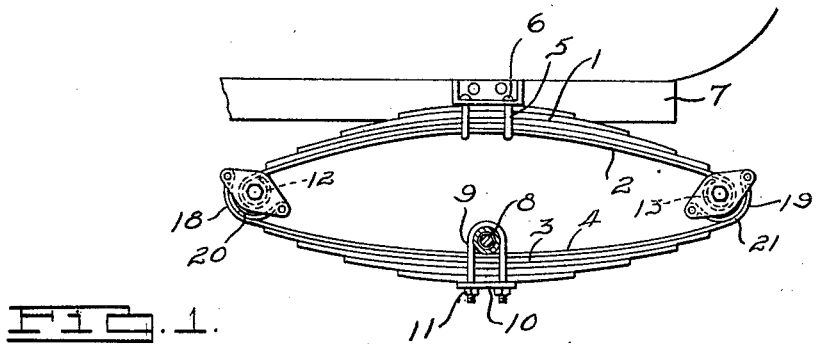
FIG. 1.
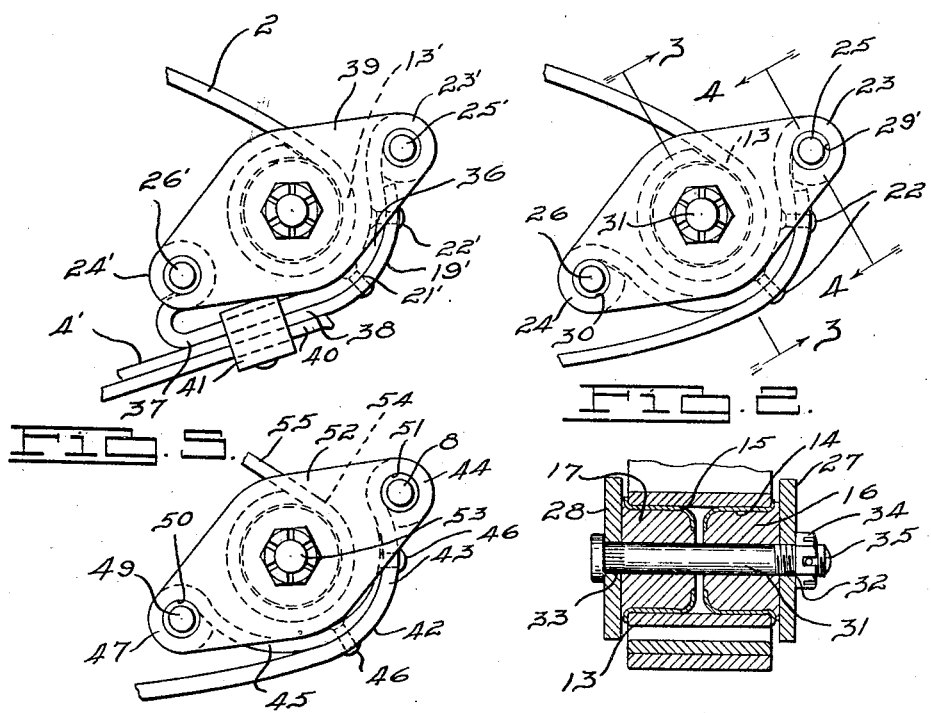
FIG. 2.
FIG. 5.
FIG. 3.
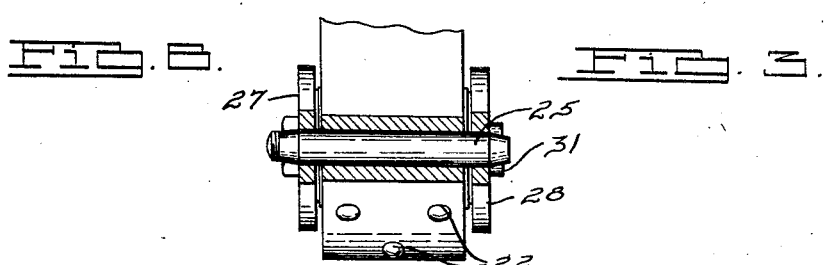
FIG. 4.
INVENTOR
BALFOUR READ
BY
*Harness, Dickey, Pierce & Hann*
ATTORNEY Patented Sept. 15, 1931

1,823,168

UNITED STATES PATENT OFFICE

BALFOUR READ, OF DETROIT, MICHIGAN, ASSIGNOR TO EATON SPRING CORPORATION, OF MASSILLON, OHIO, A CORPORATION OF OHIO

SPRING CONSTRUCTION

Application filed March 5, 1930. Serial No. 433,202.

This invention relates to spring construction, particularly for vehicle springs.

Heretofore in springs of the full and three-quarter elliptical type, it has been customary to form a pivotal support on the end of the main leaf of one spring member for receiving an eye on the main leaf of the opposite member. The material of which the spring leaves are formed is not adapted to be conveniently worked into complicated shapes and requires the handling of a comparatively large piece of metal of which only a small portion is worked upon.

The main objects of this invention are to provide improved means for pivotally connecting the upper and lower members of full and three-quarter elliptical springs together; to provide means of this kind which is formed independently of the main leaves of the spring member and of a separate piece of metal; to provide a pivotal supporting member of inexpensive construction which is rigidly attached on a spring leaf of one spring member so as to receive an eye formed on the main leaf of the other spring member; and to provide a device of this kind that does not require the end portions of the main spring leaf on which it is mounted to be worked into a complicated shape for its accommodation.

An illustrative embodiment of my invention is shown in the accompanying drawings, in which:

Fig. 1 is a side elevation of a full elliptical spring embodying my invention.

Fig. 2 is a fragmentary side elevation showing an enlarged detail view of the pivotal joint which connects an end of each of the spring members shown in Fig. 1.

Fig. 3 is a transverse section of the joint taken on the line 3—3 of Fig. 2.

Fig. 4 is a transverse section taken on the line 4—4 of Fig. 2.

Fig. 5 is a side elevation showing a pivotal joint for connecting the leaf spring member of an elliptical spring embodying a modified form of my invention.

Fig. 6 is a side elevation of a joint of this kind showing a further development of my invention.

In the form shown in Figs. 1, 2, 3 and 4, my invention is illustrated in connection with a full elliptical spring which includes an upper leaf spring member 1, having a main leaf 2, and a lower spring leaf member 3, having a main leaf 4. The leaf spring member 1 is secured by a U-shaped clamp 5 to a bracket 6 on the frame 7 of a vehicle chassis and the opposite end portions of the spring member substantially register with the respectively opposite ends of the lower spring member 3. Both of the spring members are bowed and their concave sides are adjacent each other. The intermediate portion of the lower spring member 3 is rigidly mounted on axle 8 by U-shaped members 9 which extend through apertures in a plate 10 on the lower side of the spring member and which are provided with nuts 11.

Formed on the respectively opposite end of the main leaf 2 of the upper spring member 1 are eyes 12 and 13 in which metal cups 14 and 15 are provided. Annular rubber members 16 and 17 having registering central apertures are seated in the cups 14 and 15, respectively, the outer end portions of the rubber members 16 and 17 protruding the side edges of the eye 13. This, of course, is but one type of construction that may be successfully employed in connection with the present invention, the application of other or conventional constructions in place of the particular rubber members shown being apparent from the present disclosure.

The end portions of the main leaf 4 of the lower spring member 3 are formed upwardly in an arcuate shape as shown at 18 and 19 in Fig. 1. Seated in the arcuately formed end portions 18 and 19 are yoke-shaped brackets 20 and 21, respectively, having a curvature which conforms with the curvature of the end portions 18 and 19. The brackets 20 and 21 are formed independently with respect to the main leaf 4 and consist of separate pieces of metal material which are preferably secured to the curved end portions 18 and 19 by rivets 22, but obviously any other form of fastening may be employed, such as welding, for instance. Formed on the extremities of the yoke-shaped brackets 20 and 21 are eyes 23 and 24 in which pins 25 and 26, respectively, having tapered end portions are mounted. As will be apparent, the pins 25 may take the form of bolts, if desired. The tapered end portions of the pins 25 and 26 protrude the side edges of the brackets.

Mounted on the respectively opposite sides of the brackets 20 and 21 are side plates 27 and 28, having apertures 29 and 30 in their respectively opposite ends for receiving the protruding extremities of the pins 25 and 26. The side plates 27 and 28 are firmly clamped against the protruding ends of the rubber members 16 and 17 by a bolt 31 which extends through the central apertures in the latter members and through apertures 32 and 33 in the side plates. The bolt 31 has a nut 34 on its threaded extremity 35, by means of which the rubber members 16 and 17 may be held under a substantial compression and it forms a pivot on which an eye of the upper main spring leaf 2 is journaled. The rubber members 16 and 17 provide yieldable cushions for absorbing shocks and vibration.

In the form of my invention shown in Fig. 5, a bracket having an arcuate part 36 and a substantially linear adjacent part 37 is seated on a main leaf 4' which has an arcuate part 19' conforming in curvature with the arcuate part 36 of the bracket and an adjacent substantially linear part 38 for receiving the linear part 37 of the bracket. The bracket is substantially yoke-shaped and is rigidly secured to the main leaf 4' by rivets 22'.

Formed on the respectively opposite extremities of the yoke-shaped bracket 13' are eyes 23' and 24' in which pins 25' and 26', respectively, are mounted. The pins support plates 39 in substantially the same manner as described in connection with Figs. 1, 2, 3 and 4. A bolt 31' extends through registering apertures in the side plate 39 and through the center of an eye 13' formed on the end of an upper main leaf 2'.

The linear portions 37 and 38 of the bracket 21' and main leaf 4' overlap the end portion of a leaf 40 to which the substantially linear portions 37 and 38 are firmly clamped by a band 41. The eye 13' of the main leaf 2' is provided with rubber members similar to the members 16 and 17 shown in Fig. 3.

In the form shown in Fig. 6, a main leaf 42 of a lower leaf spring member has an arcuately formed end portion 43 and an eye 44 on its extremity. A substantially semi-cylindrical bracket 45 is seated on the arcuately formed portion 43 of the main leaf 42 and rigidly secured thereto by rivets 46. This bracket has an eye 47 on its outer extremity. Mounted in the eyes 44 and 47 are pins 48 and 49 which extend into apertures 50 and 51 formed in the end portion of a pair of side plates 52. The side plates 52 are mounted on respectively opposite sides of the bracket 45 and arcuate portions 43 of the spring 44 and are firmly held thereon by a bolt 53 which extends through an eye 54 formed on the extremity of a main leaf 55 of an upper leaf spring member. The bolt 53 forms a pivot or bearing for the eye 54 which may also be provided with rubber members as described in connection with Figs. 1, 2, 3 and 4.

In all of the above forms of my invention, the brackets upon which are mounted the bearings or pivots for the eyes of the upper main leaves are formed independently of the lower main leaf of the spring construction and of a separate piece of material. These brackets are small in dimension as compared to the dimension of the main leaf and therefore by forming them independently of the main leaf the construction of the spring support is materially simplified and the danger of altering the hardening or resiliency of the main leaf of the spring is obviated.

When the elliptical springs of the type shown in Fig. 1 are placed under compression, the end portions of the upper and lower leaf spring member tend to move outwardly. The upwardly curved arcuate portion of the lower main leaf resists this outward movement materially and relieves the rivets by which the brackets are secured to the arcuate portion from shearing stress.

Although but several specific embodiments of my invention are herein shown and described, it will be understood that numerous details of the construction shown may be altered or omitted without departing from the spirit of this invention, as defined by the following claims.

What I claim is:

1. In a resilient support, a pair of leaf springs each having a main leaf, a yoke formed of a separate piece of material and rigidly secured on one of said main leaves, a pair of plates one on each respectively opposite side of said yoke, and a pivotal support mounted on said plates, the main leaf of the other leaf spring being journaled on said pivotal support.

2. In a resilient support, a pair of leaf springs each having a main leaf, a yoke formed of a separate piece of material and rigidly secured on one of said main leaves, a pair of plates one on each respectively opposite side of said yoke, a pivotal support mounted on said plates, and an eye formed on the main leaf of the other leaf spring and journaled on said pivotal support.

3. An elliptical spring comprising a pair of oppositely arranged leaf spring members each having a main leaf, a pair of brackets each formed independently of said main leaves and formed of separate pieces of material, one mounted on each respectively opposite end portion of one of said main leaves, and a pair of pivots one on each of said brackets, the ends of the other main leaf being pivotally secured to said pivots respectively.

4. An elliptical spring comprising a pair of oppositely arranged leaf spring members each having a main leaf, a pair of yokes each formed independently of said main leaves, one mounted on each end portion of one of said main leaves, a pair of side plates on each of said yokes, a pair of bolts one extending through each yoke and clamping the side plates thereon, and eyes formed on the respectively opposite ends of the other main leaf and journaled on said bolts.

5. In a substantially full elliptical spring, a pair of leaf spring members each having a main leaf, an eye on an end of the main leaf of one of said members, an arcuately formed portion on an end of the main leaf of the other member, a bracket seated in said arcuately formed portion, rivets rigidly securing said bracket to said arcuately formed portion, and a pivotal support mounted on said bracket and extending through said eye for pivotally connecting said main leaves together.

6. In a substantially full elliptical spring, a pair of leaf spring members each having a main leaf, an eye on an end of the main leaf of one of said members, an arcuately formed portion on an end of the main leaf of the other member, a bracket seated in said arcuately formed portion and rigidly secured thereto, and a pivotal support mounted on said bracket and extending through said eye for pivotally connecting said main leaves together.

7. An elliptical spring comprising a pair of main spring leaves, a bracket on an end of one of said main spring leaves formed independently of said leaves and consisting of a separate piece of material, an eye on the other main spring leaf, compressible members in said eye, a pair of plates, one on each side of said bracket, and a bolt extending through apertures in said plates and through said eye pivotally connecting said spring leaves together, said bolt being adapted to retain said compressible members under compression between said side plates.

8. An elliptical spring comprising a pair of main spring leaves, a yoke on one of said spring leaves formed independently of said leaves of a separate piece of material, eyes on the ends of said yoke, a pair of guide pins, one in each of said eyes protruding the side edges of said yoke, a pair of side plates having apertures for receiving said guide pins, one on each side of said yoke, a bearing member carried by said side plates, and an eye on the other main spring leaf journaled on said bearing.

BALFOUR READ.